United States Patent [19]

Kinoshita

[11] Patent Number: 4,641,183
[45] Date of Patent: Feb. 3, 1987

[54] IMAGE PICK-UP APPARATUS

[75] Inventor: Takao Kinoshita, Tokyo, Japan

[73] Assignee: Canon Kabushiki Kaisha, Tokyo, Japan

[21] Appl. No.: 511,990

[22] Filed: Jul. 8, 1983

[30] Foreign Application Priority Data

Jul. 16, 1982 [JP] Japan .................................. 57-124185

[51] Int. Cl.⁴ ............................................. H04N 9/07
[52] U.S. Cl. ...................................... 358/44; 358/41; 358/213
[58] Field of Search ...................... 358/41, 43, 44, 213; 357/30

[56] References Cited

U.S. PATENT DOCUMENTS

| Re. 30,800 | 11/1981 | Yamanaka | 358/44 |
| 4,001,878 | 1/1977 | Weimer | 358/41 |
| 4,320,413 | 3/1982 | Takemura | 358/44 |
| 4,367,492 | 1/1983 | Harada | 358/44 |

Primary Examiner—Michael A. Masinick
Attorney, Agent, or Firm—Fitzpatrick, Cella, Harper & Scinto

[57] ABSTRACT

A signal processor comprises: a color filter consisting of portions having a plurality of color spectral characteristics; a photoelectric converting device for converting the light transmitted through the filter into an electric signal; a plurality of horizontal shift registers; a plurality of vertical shift registers for distributing and storing an output of one of these shift registers for each color component; and a driver circuit for driving the vertical shift registers.

16 Claims, 14 Drawing Figures

IMAGE PICK-UP APPARATUS

BACKGROUND OF THE INVENTION

1. Field of the Invention

This invention relates to a signal processor for processing picture or image signals, and more particularly to a signal processor having an image pick-up function.

2. Description of the Prior Art

Conventionally, it is considered that an interline transfer type CCD or an MOS type sensor is used to convert, for example, the information of one picture into a sequential signal of two fields.

However, the transfer path, gate, etc. are provided in the photoreceptive surface of these sensors; therefore, there are drawbacks such that the opening aperture ratio becomes small and the sensor sensitivity is reduced.

In addition, from the viewpoint of semiconductor manufacturing technology, there are also drawbacks in that since high integration is necessary, the yield is bad and it is impossible to increase the number of picture elements or cells.

On the other hand, the use of the frame transfer type CCD enables the elimination of such drawbacks; however, it has been impossible for the frame transfer type CCD to convert one picture into a two-field sequential signal.

SUMMARY OF THE INVENTION

An object of the present invention is to provide a novel semiconductor image pick-up device, or a semiconductor signal processing device, and a signal processor including the same, such as to solve such drawbacks in the prior-art technology.

To accomplish this object, the present invention has the feature that a plurality of horizontal shift registers are provided, thereby allowing them to be sequentially driven.

Another feature of the invention is that a plurality of horizontal shift registers are provided and a control unit to drive these registers one by one is provided.

Still another object of the invention is that the outputs of the horizontal registers are introduced to an output amplifier through a plurality of transfer paths and that each register is enabled to perform the photoelectric converting function.

A more specific feature of the invention is that an image pick-up device having a small chip area is provided in combination with a shutter.

A still more specific feature of the invention is that a color filter having a plurality of color stripes is disposed for the signal processor and each color signal component to be read out from a plurality of horizontal shift registers is distributed to a plurality of transfer paths and read out.

A further feature of the invention is that the respective photoreceptive device is connected to each bit of a plurality of horizontal registers and the horizontal shift registers are shielded against the light, thereby providing an image pick-up apparatus with little smear which easily enables interlacing.

Other objects, features and advantages of the present invention will be more apparent from the following description of preferred embodiments, taken in conjunction with the accompanying drawings.

DETAILED DESCRIPTION OF THE PREFERRED EMBODIMENTS

An embodiment of the present invention will now be described in detail hereinbelow with reference to the drawings.

Figure 1:
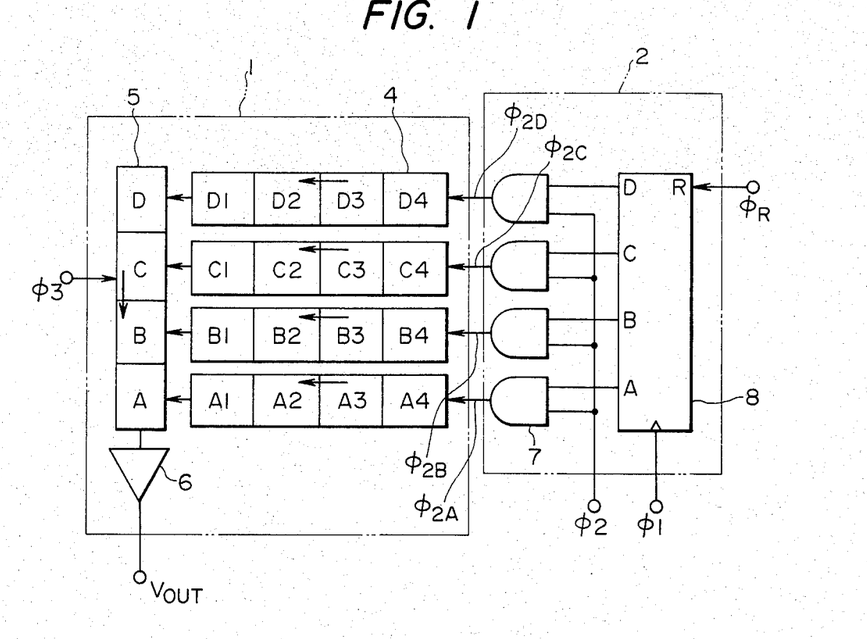
Fig. 1 is a diagram showing a first embodiment of a memory array of a signal processor of the present invention.
Figure 2:
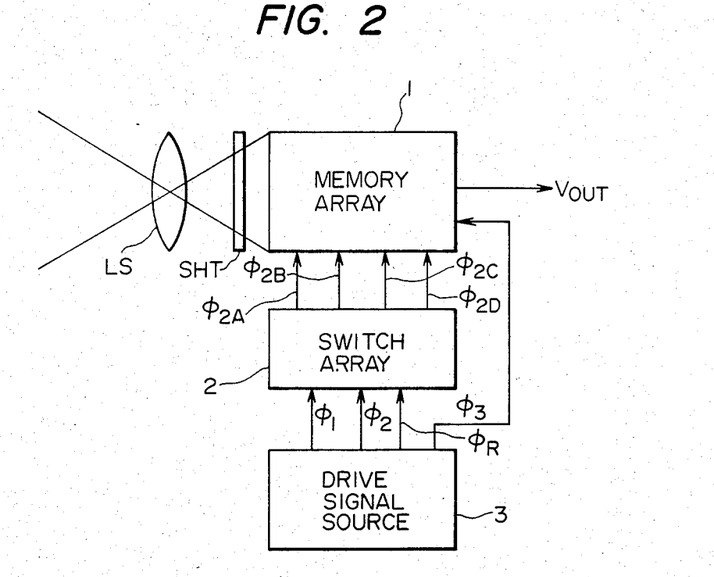
FIG. 2 is a diagram showing an example of the structure of the signal processor of the invention.
Figure 3:
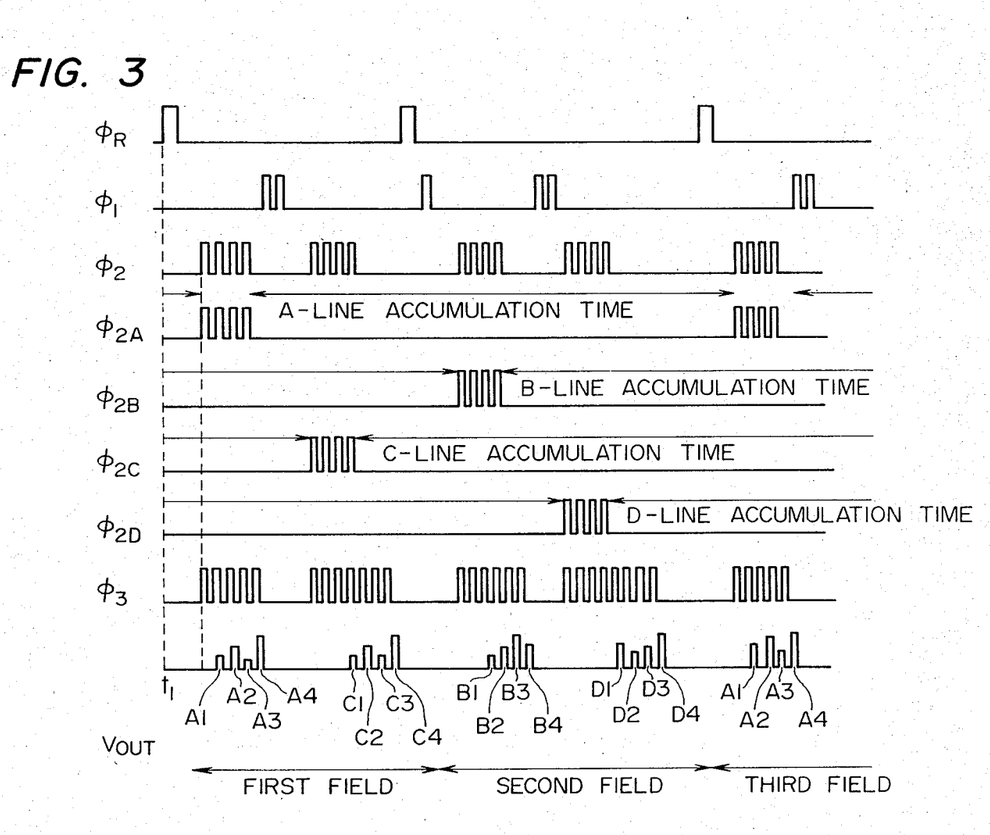
FIG. 3 shows timing charts for describing the control operation by a control unit.

In FIGS. 1 to 3, a reference numeral 1 indicates a memory array; 2 denotes a switch array; and 3 shows a drive signal source. A control driving apparatus of the present invention comprises these switch array 2 and signal source 3, and the like. The memory array 1 includes horizontal shift registers 4 of the CCD type, vertical shift registers 5 of the CCD type, and a charge-voltage converting amplifier 6 as an output amplifier. The switch array 2 includes AND gates 7 and a shift register 8. The shift register 8 may be of the CCD type. A reference character LS represents an optical system for introducing a picture image of a subject onto the memory array 1.

In the embodiment of FIG. 1, the horizontal shift registers 4 act to perform the photoelectric converting function by themselves, and the incidence of light beam is controlled by a shutter SHT in the still mode to pickup one picture only. In FIG. 1, the operation will be explained with respect to an example of 4×4 picture elements for simplicity. For the registers 4, for instance, 525 lines corresponding to one frame of a TV screen are arranged.

The vertical shift registers 5 have the bits corresponding to at least the number of lines of the horizontal shift registers 4. These shift registers may be merely lead wires.

Whenever a pulse $\phi_1$ is applied, the shift register 8 switches over the terminals A-D in order and sequentially outputs higher-level signals. When a pulse $\phi_R$ is applied, the higher-level signal returns to the terminal A.

The registers 5 are driven by a pulse $\phi_3$. Pulses $\phi_{2A}-\phi_{2D}$ serve to drive the 1st to 4th horizontal shift registers 4 from the bottom of FIG. 1. $\phi_2$ is a clock pulse.

The operation of the signal processor of the present invention with such a structure will be described hereinafter with respect to FIG. 3.

First, the terminal A of the register 8 is set into a higher level by the pulse $\phi_R$ to select the first row which is an odd-number line. Then, pulses $\phi_{2A}$ and $\phi_3$ as shown in FIG. 3 are supplied to read out charges or charge packets $A_1$-$A_4$.

Then, two pulses $\phi_1$ are supplied for allowing the terminal C to be at a higher level, thereby selecting the third row. Pulses $\phi_{2C}$ and $\phi_3$ are supplied to read out charges $C_1$-$C_4$. Next, after once returning the register to the terminal A by the reset pulse $\phi_R$, the pulse $\phi_1$ is supplied for allowing the terminal B to be at a higher level. And pulses $\phi_{2B}$ and $\phi_3$ are supplied to read out the second row. Then, after two pulses $\phi_1$ have been supplied, the fourth row is read out by pulses $\phi_{2D}$ and $\phi_3$.

As described above, the horizontal shift registers are selected by the switch array 2 and, for example, the lines bearing odd numbers are first sequentially read out, then the lines bearing even numbers are sequentially read out. Thus, the information of one frame can be output as the two-field signal sequentially one field by one. Moreover, since the output amplifier is commonly used, the entire structure is simplified, and since a common charge transfer path is used as a path to the common output amplifier 6, the signal leakage and crosstalk are also small.

The timings shown in FIG. 3 are used in the moving mode, namely, for continuous pickup. In the still mode, that is to say, in the case where one frame is picked up, the shutter SHT is used and it is opened for only a predetermined period of time before starting the read out to perform the pickup of one frame; thereafter, the shutter is kept closed during the read-out interval.

The read-out operation in such a case may be similar to that shown in FIG. 3.

A ring counter or the like may be substituted for the registers in the embodiment shown in FIG. 1.

Then, a second embodiment of the memory array of the present invention will now be described with reference to FIG. 4A, wherein the same parts and elements as those shown in FIG. 1 will be designated by the same reference numerals.

Figures 4A, 4B:
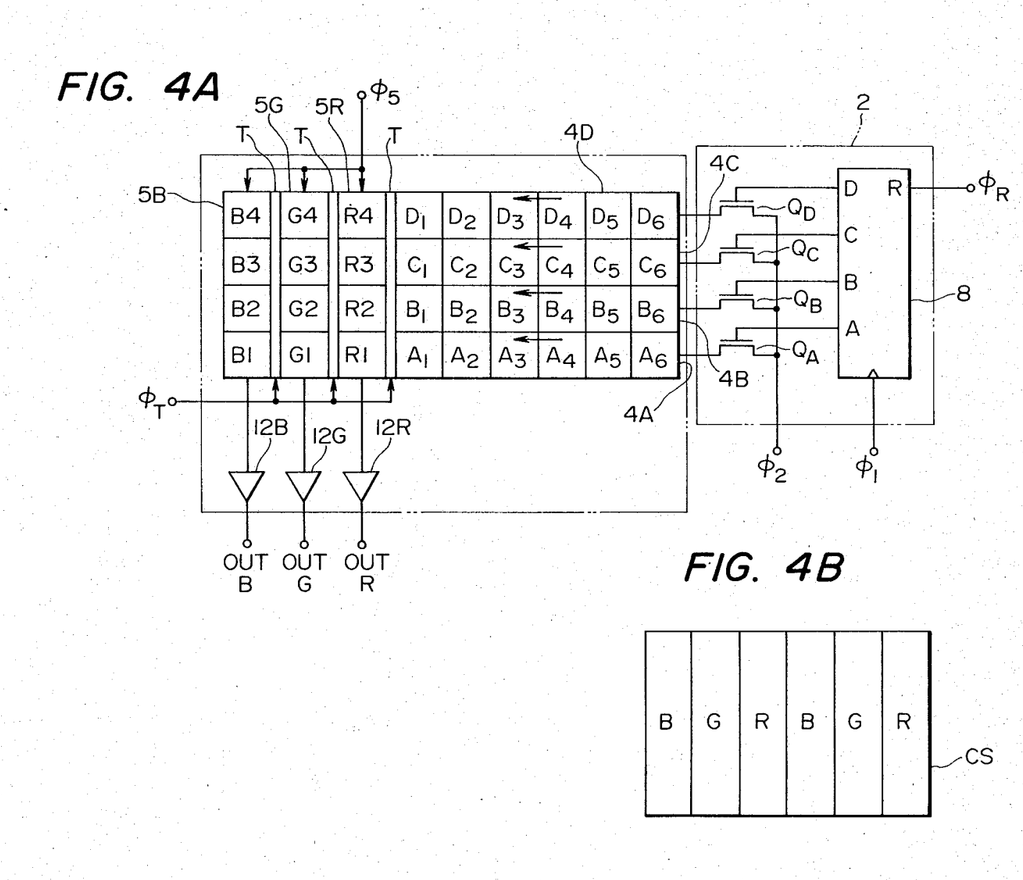
FIG. 4A is a diagram showing the structure of a second embodiment of the memory array of the signal processor of the invention.
FIG. 4B is a diagram showing an example of the color filter which is suitable for the use of the memory array shown in FIG. 4A as an image pick-up apparatus.

In FIG. 4A, characters $Q_A$-$Q_D$ indicate transistors whose gate electrodes are controlled by terminals A-D of the shift register 8. These transistors constitute the AND gates 7 of FIG. 1, respectively. Numerals 4A-4D indicate horizontal shift registers, respectively, each consisting of six pixels in this embodiments. Actually, the picture elements of approximately, for example, 490(V)×700(H) are desired. A color stripe filter CS for color separation consisting of, for instance, the repeated patterns of color spectral characteristics such as B (blue), G (green) and R (red) as shown in FIG. 4B disposed over the group of picture elements of the horizontal shift registers.

The color filter is arranged so that the pitch of stripe coincides with the pitch of pixel of the horizontal shift registers 4A-4D.

Numerals 5B, 5G and 5R respectively indicate vertical shift registers to read out the signals corresponding to the blue, green and red filters, respectively.

Each of the shift registers 5B, 5G and 5R is driven by a common drive pulse $\phi_5$. A gate electrode T acts to collect the charges under the gate electrode while a gate pulse $\phi_T$ is at a higher level and to shift these charges under the electrode to the picture elements of the adjacent registers on the left side in FIG. 4A by the trailing edge of the pulse $\phi_T$. Amplifiers 12B, 12G and 12R serve to amplify outputs of the registers 5B, 5G and 5R.

Figure 4C:
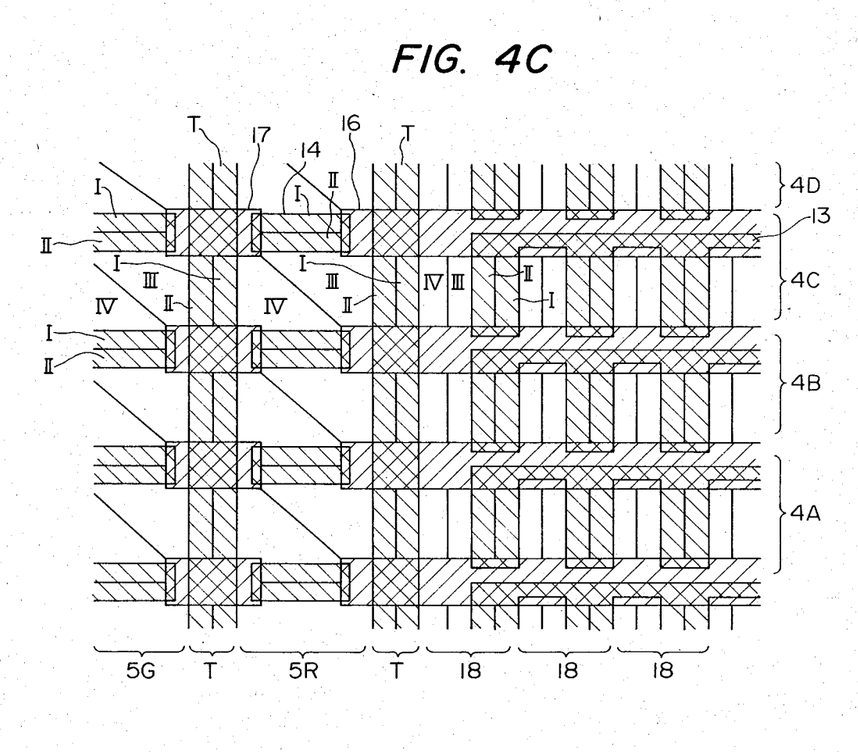
FIG. 4C is a structural diagram of the electrodes of the memory array of FIG. 4A.

FIG. 4C is a diagram showing an example of the electrode structure of the memory array as mentioned above. In this embodiment, the example of the electrode structure in case of one-phase driving system is shown.

In FIG. 4C, the sections indicated by the right-side-falling oblique lines represent the transparent transfer electrodes or gate electrodes. Among them, a reference numeral 13 denotes horizontal transfer electrodes of the horizontal shift registers; 14 shows vertical transfer electrodes of the vertical shift registers; T indicates gate electrodes provided between the horizontal shift registers and vertical shift registers and between the vertical shift registers; 16 indicates channel stops to prevent the movements of the charges between the horizontal shift registers 4A-4D; and 17 indicates channel stops provided in the vertical shift registers. A numeral 18 indicates a range of one pixel. The respective transfer electrodes and gate electrodes are provided through insulating layers to the semiconductor substrate. Potential barriers with predetermined levels are formed in the semiconductor substrate by ion injection or the like. For example, the potential level (hereinafter, abbreviated to as potential) for the electrons in the region I under the electrode is always set to be higher than the potential in the region II. The potential in the region III at the section which is not covered by the electrode is always set to be higher than the potential in the region IV.

The potentials in the regions III and IV are fixed.

The potentials in the regions I and II vary in dependence upon the voltages to be applied to the transfer electrodes.

For example, in case of p-type substrate, when a higher-level voltage is applied to the transfer electrodes, the potentials in the regions I and II reduce than those in the regions III and IV. When a lower-level voltage is applied, they rise than the potentials in the regions III and IV. Therefore, when alternating pulses at higher and lower levels are supplied to each transfer electrode, the charges in the substrate sequentially move in the direction of I→II→III→IV→I→II ....

Figure 4D:
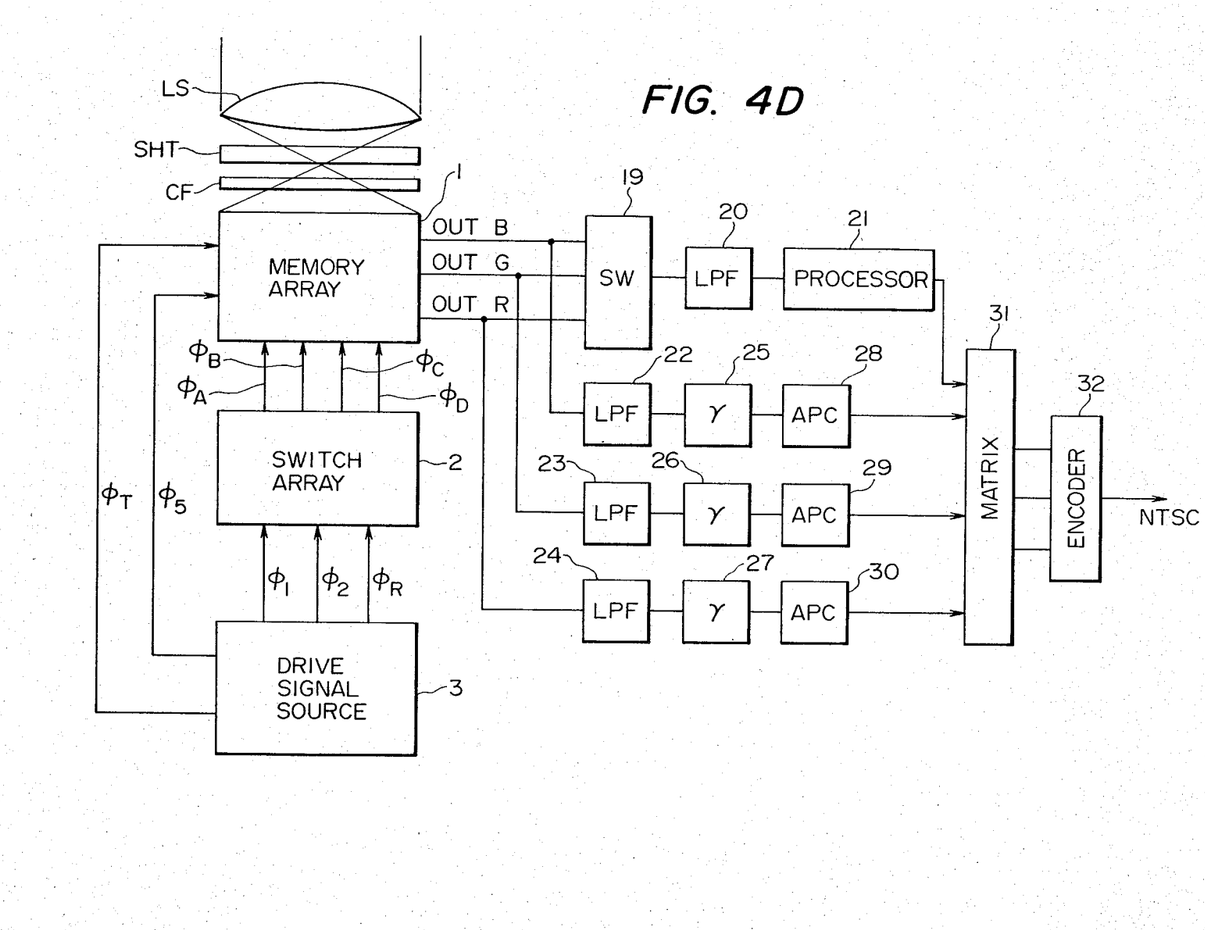
FIG. 4D is a diagram showing an example of the signal processing circuit when the memory array of FIG. 4A is used in the image pick-up apparatus.

FIG. 4D is a diagram showing an example of the structure of the image pick-up apparatus using the signal processor of the present embodiment.

Only the horizontal shift registers 4A-4D in the memory array of FIG. 4A are exposed and the other portions are shielded against the light.

In the memory array 1, the horizontal shift registers 4A-4D to be read out are respectively selected by selection pulses $\phi_A$-$\phi_D$ from the switch array 2. This switch array 2 is controlled by clock pulses $\phi_1$, $\phi_2$ and $\phi_R$ from the drive signal source 3. Pulses $\phi_5$ and $\phi_T$ also are output from the drive signal source 3. In this embodiment, the driving apparatus also comprises the switch array 2 and signal source 3.

In FIG. 4D, a switching circuit 19 sequentially changes over the signals OUT B, OUT G and OUT R read out from each of the vertical shift registers 5B, 5G and 5R by a predetermined frequency and then outputs them in to a series to a low-pass filter 20 at the latter stage. The switching frequency of the circuit 19 is selected to correspond to the filter pitch of the color filter CS. The low-pass filter 20 limits these point sequential signals with high frequencies to a predetermined frequency band, thereby producing the luminance signal without any folded-distortion. A processing circuit 21 serves to apply various kinds of corrections ($\gamma$ correction, aperture correction, black level clamping, white clipping, etc.) to this luminance signal. Low-pass filters 22-24 having relatively lower cut-off frequencises act to cut off the high frequency components included in each color signal, thereby preventing the moire.

$\gamma$(gamma) correction circuits 25-27 act to non-linearly amplify the input/output characteristics of each color signal. Aperture correction circuits 28-30 act to compensate the contour. A matrix circuit 31 produces for example, the color-difference signal and corrected luminance signal from the luminance signal and each color signal. An encoder 32 performs the modulation of these color-difference signal and luminance signal or the like to produce a predetermined standard television signal (NTSC, PAL, SECAM, etc.)

Figure 4E:
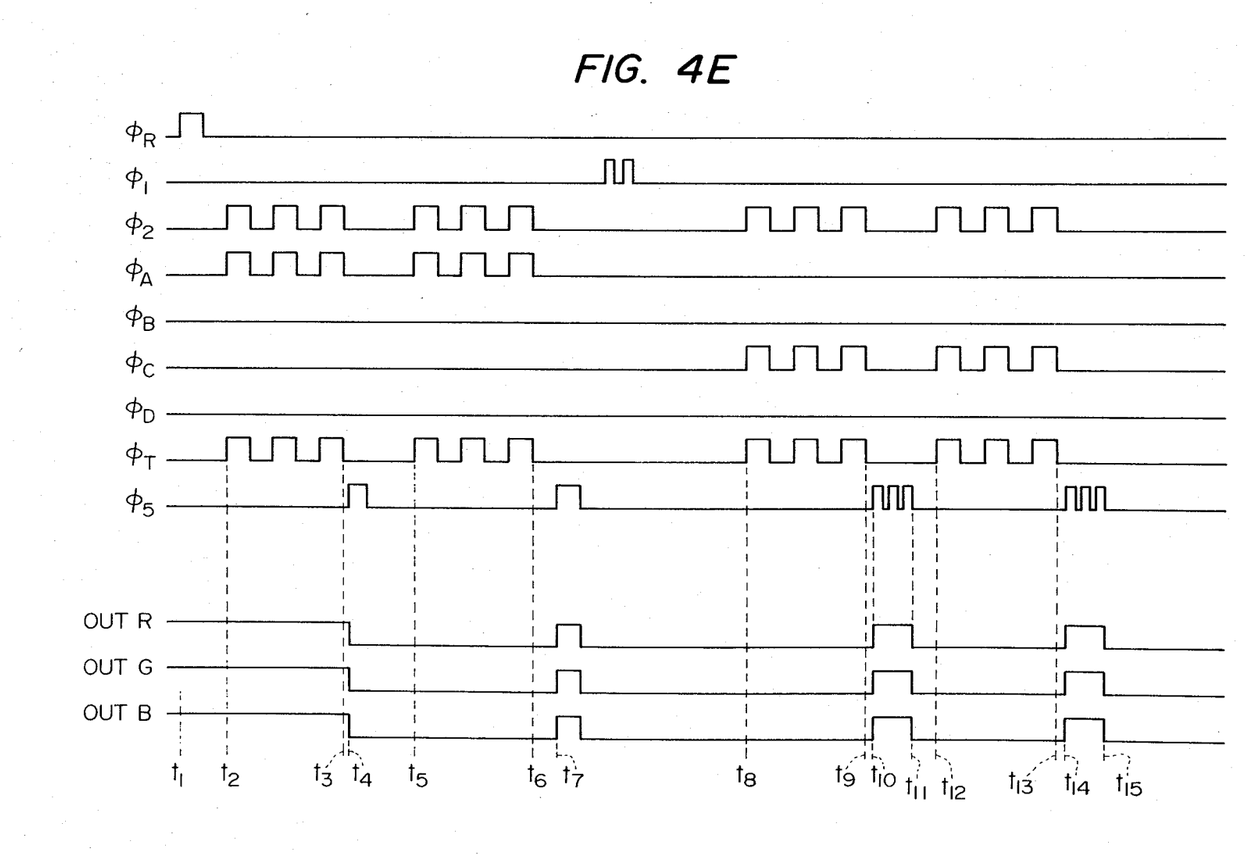
FIG. 4E shows timing charts for describing the driving operation of the signal processing circuit of FIG. 4D.

FIG. 4E shows drive timing charts of the signal processor as such an image pick-up apparatus. A pulse $\phi_R$ is first input at timing $t_1$ synchronously with a vertical sync signal of the standard television signal, causing the register 8 to be reset. Thus, a higher-level signal is output from the terminal A of the register 8 for allowing the transistor $Q_A$ to be turned on. Then, pulses $\phi_2$ are supplied to the horizontal shift register 4A, so that three picture elements of the register 4A are shifted to the left in FIG. 4A during the timing of $t_2$ to $t_3$. At this time, when a pulse $\phi_T$ is also supplied together with the pulses $\phi_2$ with the same phase, the charge of the pixels $A_1$-$A_3$ are shifted to the pixels $B_1$, $G_1$ and $R_1$ of the vertical shift registers $5_B$-$5_R$.

Next, when a pulse $\phi_5$ is supplied at timing $t_4$ for allowing the charge of each of the vertical shift registers 5B, 5G and 5R to be read out through the amplifiers 12B, 12G and 12R as shown in FIG. 4E. Thereafter, during the timing of $t_5$ to $t_6$, three picture elements of the horizontal shift register 4A are also shifted to the left by the pulses $\phi_A$ and $\phi_T$, so that the charges of the pixels $A_4$-$A_6$ are shifted to the pixels $B_1$, $G_1$ and $R_1$ of the registers 5B, 5G and 5R. Then, these charges are read out by the pulse $\phi_5$ at timing $t_7$.

After a short time, two pulses $\phi_1$ are supplied, so that the terminal C of the register 8 becomes a higher level, causing the transistor $Q_C$ to be turned on. Hence, the pulses $\phi_C$ are supplied to the horizontal shift registers 4C.

After that, during the timing of $t_8$ to $t_9$, three pulses are supplied respectively as the pulses $\phi_C$ and $\phi_T$, so that the charges of the pixels $C_1$-$C_3$ are shifted to the pixels $B_3$, $G_3$ and $R_3$, respectively. During the timing of $t_{10}$ to $t_{11}$, three pulses are supplied as the pulse $\phi_5$, causing those charges to be read out. During the timing of $t_{12}$ to $t_{13}$, three pulses are supplied again as $\phi_C$ and $\phi_T$, causing the pixels $C_4$-$C_6$ to be shifted to the pixels $B_3$, $G_3$ and $R_3$, respectively. Then, three pulses are supplied as $\phi_5$ during the timing of $t_{14}$ to $t_{15}$, so that the charges are read out. Thereafter, the contents of the horizontal shift registers are similarly read out every other line. The charges in the residual horizontal lines are sequentially read out during the next field interval. In this manner, the horizontal shift registers are switched over by the shift register 8 at every horizontal period of the standard television and read out.

The present embodiment is so constituted as described above, so that the structure of the image sensing array (i.e., photoreceptive section) can be simplified. Therefore, the opening ratio is remarkably increased and the chip area is also improved to be about half as compared with that of the conventional frame transfer type.

Figure 4F:
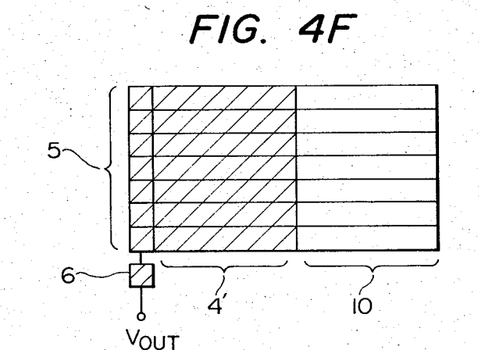
FIGS. 4F and 4G are diagrams showing third and fourth embodiments of the memory array of the invention.
Figure 4G:
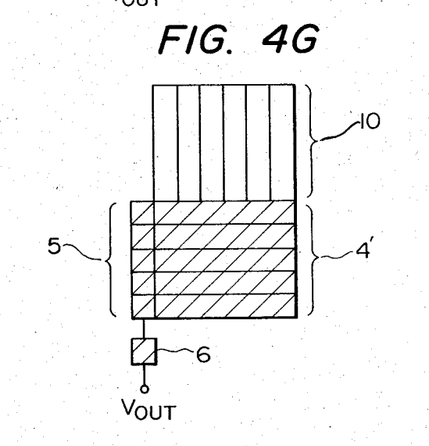

FIGS. 4F and 4G show third and fourth embodiments, wherein a group of horizontal shift registers 4' are used as memories and an image sensing array 10 is separately provided. In FIG. 4F, the image sensing array is connected horizontally. In FIG. 4G, it is connected vertically. In the latter case, each register of the register group 4' as a memory array is also provided with a vertical transferring function.

With such structures as examples of FIGS. 4F and 4G, no shutter is necessary in the still mode.

In other words, after performing the pickup for a predetermined period of time, the information of the image sensing array is once stored in the memory array 4'. Thereafter, the image pick-up apparatus is driven in like manner as FIG. 3, so that the information is read out.

Figure 5A:
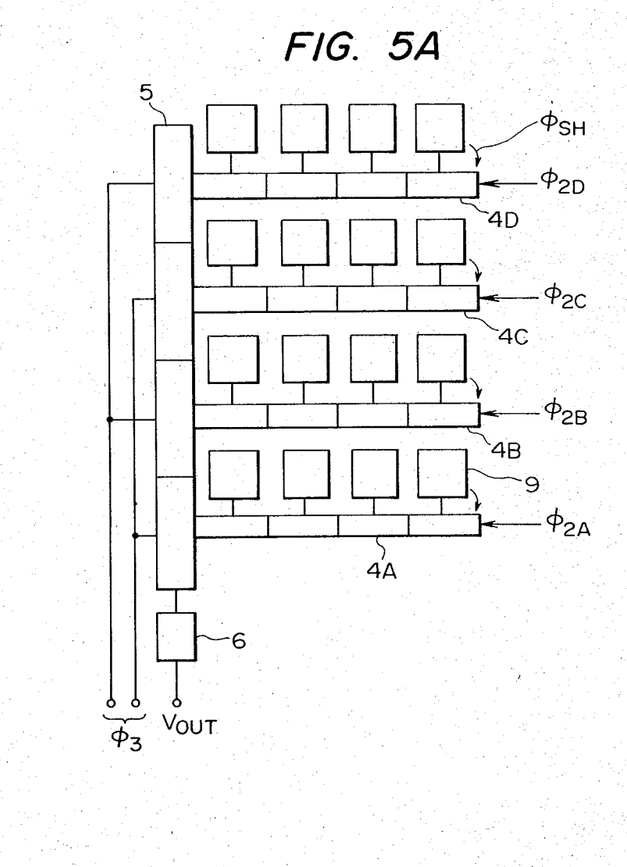
FIG. 5A is a diagram showing a fifth embodiment of the memory array of the invention.

FIG. 5A is a schematic diagram showing the structure of a fifth embodiment of the present invention. In this embodiment, photoreceptive devices 9 as photoelectric converting means are connected to each bit of the horizontal registers 4. The registers 4 and 5, etc. are shielded against the light. The gates between each photoreceptive device 9 and each bit of the registers 4 are opened by pulses $\phi_{SH}$, thereby shifting the charges of the photoreceptive devices 9 in the registers 4. In this way, there is no need to use the shutter even in the still mode. That is to say, the accumulation time can be specified by the interval of the pulses $\phi_{SH}$.

Figure 5B:
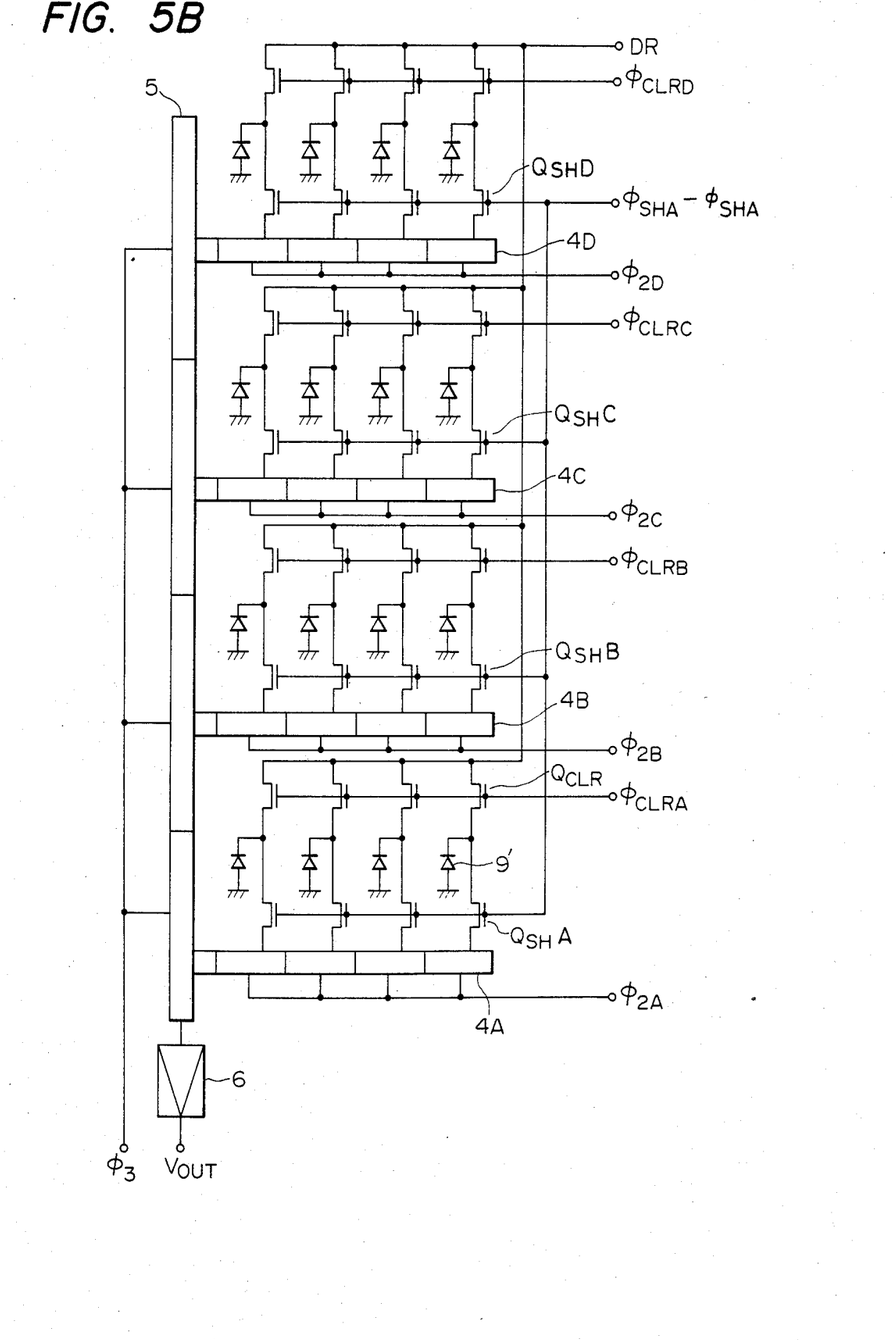
FIG. 5B is a further detailed diagram for describing the memory array in the fifth embodiment of FIG. 5A.

FIG. 5B is a detailed diagram of an example of the structure of FIG. 5A, wherein the same parts and elements as those shown in FIG. 5A are designated by the same reference numerals.

In FIG. 5B, a reference character $Q_{CLR}$ represents a clear gate provided between the cathode and drain DR of a photodiode 9' as each photoreceptive device. When pulses $\phi_{CLRA}$-$\phi_{CLRD}$ at higher levels are supplied, the charges which have been preliminarily accumulated in the photodiodes 9' are drained to the drain DR. $Q_{SHA}$-$Q_{SHD}$ indicate shift gates to shift the charged accumulated in the photodiodes 9' to the horizontal shift registers 4A-4D, respectively. Pulses $\phi_{SHA}$-$\phi_{SHD}$ are supplied respectively to the control electrodes of each gate. While the pulses $\phi_{SHA}$-$\phi_{SHD}$ are at a higher level, the charges in the photodiodes 9' are shifted.

Figure 5C:
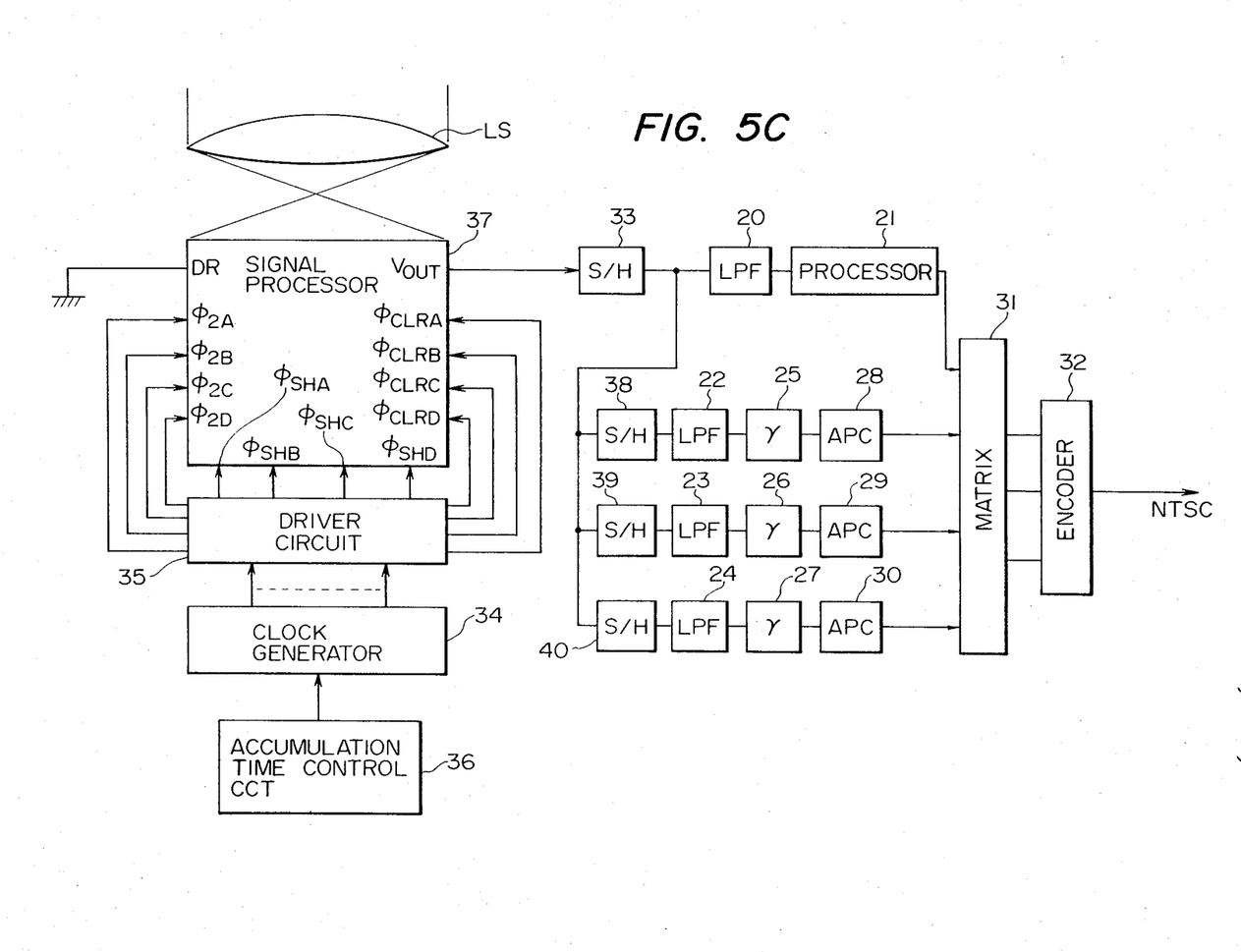
FIG. 5C is a diagram showing an example of the structure of the image pick-up apparatus using the memory array of FIG. 5B.
Figure 5D:
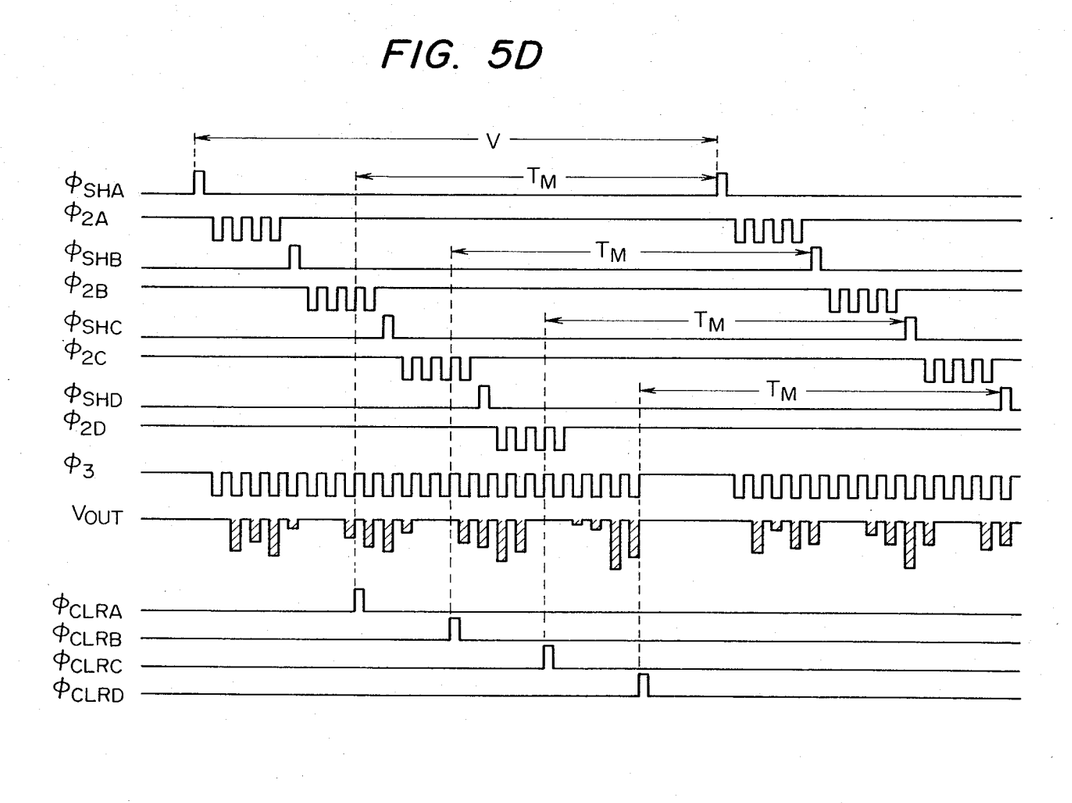
FIG. 5D shows timing charts of the output pulses of a driver circuit shown in FIG. 5C.

FIG. 5C is a diagram showing an example of the structure of the image pick-up apparatus using such a signal processor, wherein the same parts and elements as those shown in FIG. 4D are designated by the same reference numerals. In FIG. 5C, a clock generator 34 generates timing pulses for the pulses $\phi_{2A}$-$\phi_{2D}$, $\phi_{SHA}$-$\phi_{SHD}$, $\phi_{CLRA}$-$\phi_{CLRD}$, etc. A driver circuit 35 as a driving apparatus forms the drive pulses as shown in FIG. 5D on the basis of those timing pulses. An accumulation time control circuit 36 controls the accumulation time of the charges in a signal processor 37.

Concretely, this accumulation time control circuit 36 includes a setting device to manually or automatically set the accumulation time. The phase relation between the pulses $\phi_{CLRA}-\phi_{CLRD}$ and the pulses $\phi_{SHA}-\phi_{SHD}$ is changed by the output of this setting device.

A numeral 37 indicates the signal processor as shown in FIG. 5A or 5B, which is constituted in such a manner that an optical image enters the photoreceptive devices 9 or 9' of this signal processor 37. A sample holding circuit 33 is used to elevate the duty of the output signal from the signal processor 37. Sample holding circuits 38-40 act to separate into color signals of R, G and B from the point sequential signal output from the sample holding circuit 33.

FIG. 5D shows timing charts indicating the output pulses of the driver circuit 35 shown in FIG. 5C. The charges of the photodiodes 9' are shifted first to the shift register 4A during the horizontal blanking interval. Then, the horizontal shift register 4A is driven by the pulses $\phi_{2A}$ during the horizontal scanning interval. Next, after the charges of the photodiodes have been shifted to the shift register 4B similarly, this register 4B is driven.

In this way, the horizontal shift registers 4A-4D are sequentially driven during the horizontal scanning period, so that the respective registers 4A-4D are driven at every vertical interval V.

When the time value $T_M$ is set by the accumulation time control circuit 36, the pulses $\phi_{CLRA}-\phi_{CLRD}$ are sequentially output by this. Each of these pulses $\phi_{CLRA}-\phi_{CLRD}$ is output with the phase which is faster by only timing $T_M$ than the pulses $\phi_{2A}-\phi_{2D}$, respectively.

Thus, the charges accumulated during the first interval $(V-T_M)$ in one vertical interval V are drained to each photoreceptive diode 9'; consequently, the accumulation time becomes $T_M$.

As described above, according to the present embodiment, it is possible to obtain the image pickup effect similar to a focal plane shutter consisting of a front blind curtain and a rear blind curtain in a silver-salt photograph. There is also an effect such that the smearing phenomenon is hard to occur as compared with the conventional interline type CCD or frame transfer type CCD.

What I claim is:

1. An image pick-up apparatus comprising:
  (a) a plurality of horizontal shift registers constructed in a plurality of rows, each of said horizontal shift registers comprising charge transfer devices which are serially connected to each other in the horizontal direction, wherein said charge transfer devices accumulate charges corresponding to incident light and transfer said charges in the horizontal direction through different respective channels;
  (b) a plurality of vertical shift registers, each of said vertical shift registers having a plurality of charge transfer cells wherein each of said cells is connected to a corresponding one of the horizontal shift registers; and
  (c) driving means for selectively driving said horizontal shift registers row by row to supply said charges to corresponding charge transfer cells of said plurality of vertical shift registers.

2. An image pick-up apparatus according to claim 1, wherein said driving means sequentially drives said horizontal shift registers row by row at every horizontal period of the standard television scanning period.

3. An image pick-up apparatus according to claim 1, further comprising optical means for forming an optical image on said plurality of horizontal shift registers.

4. An image pick-up apparatus according to claim 3, wherein said optical means includes a color separation filter for respectively entering the lights having predetermined color spectral characteristics to predetermined different portions of said plurality of horizontal shift registers.

5. An image pick-up apparatus according to claim 4, wherein said plurality of vertical shift registers distribute and accumulate predetermined color components accumulated in each of said horizontal shift registers to the corresponding vertical shift registers, respectively.

6. An image pick-up apparatus according to claim 1 further comprising a gate electrode for controlling the horizontal transfer of the charges between said plurality of vertical shift registers.

7. An image pick-up apparatus comprising:
  (a) a plurality of photoelectric converting means arranged in a matrix consisting of rows and columns, wherein said photoelectric converting means receive light and produce respective charge signals in response to the light;
  (b) a plurality of horizontal shift registers arranged to correspond to respective rows of said photoelectric converting means, each of said horizontal shift registers including a plurality of charge transfer cells each of which stores a signal received from the corresponding said row, and said registers being arranged so as to be shielded against the light, and to serially transfer charges through different respective channels;
  (c) means for sequentially driving said horizontal shift registers row by row for transferring said signals in the horizontal direction;
  (d) means for vertically transferring the signals read out from said horizontal shift registers by said driving means; and
  (e) means for outputting the signals transferred by said vertical transferring means.

8. An image pick-up appartus according to claim 7, wherein said photoelectric converting means include photodiodes.

9. An image pick-up apparatus according to claim 7, wherein said driving means sequentially drives said plurality of horizontal shift registers row by row at every horizontal period of the standard television scanning period.

10. An image pick-up apparatus according to claim 7 further comprising a charge drain for clearing the signals which were photo-electric converted by said photoelectric converting means.

11. An image pick-up apparatus comprising:
  (a) a plurality of horizontal shifting means for photoelectrically converting two dimensional image signal information and sequentially reading out said photoelectrically converted information row by row in arbitrary order, each of said horizontal shifting means serially shifting said photoelectrically converted information in the horizontal direction through a different respective channel;
  (b) memory means for storing output signal of said plurality of horizontal shifting means; and (c) reading out means for reading out in a selected arbitrary order said image information stored in said memory means.

12. An image pick-up apparatus according to claim 11, wherein each of said plurality of horizontal shifting means has a photoelectric converting ability.

13. An image pick-up apparatus according to claim 11, wherein each of said plurality of horizontal shifting means includes a line of photoelectric converting devices serially arranged in the horizontal direction.

14. An image pick-up apparatus according to claim 11, further comprising drain arranged between said plurality of horizontal shifting means for cleaning image information.

15. An image pick-up device comprising:
(a) a plurality of charge transfer means for photoelectrically converting two dimensional image information and sequentially reading out said photoelectrically converted image information, said charge transfer means having a plurality of output channels through which said charge information is serially transferred in a first direction to be read out, and being disposed in an image area;
(b) memory means for storing said information which is read out by said charge transfer means, said memory means comprising input channels for inputting charge by transferring charge in the first transfer direction and output channels for outputting charge by transferring charge in a second direction perpendicular to the first direction, and said memory means comprising a plurality of charge transfer devices which are arranged in a matrix, and being disposed out of said image area; and
(c) stored signal reading out means arranged in the first direction for reading out output signal of said memory means and having a plurality of input channels for inputting charge by transferring charge in the second direction.

16. An image pick-up device according to claim 15, wherein said memory means includes electrodes for controlling the charge transfer therein.

* * * * *